May 5, 1959 W. J. BROWN 2,885,621
CURRENT REGULATING CIRCUITS FOR MOTOR CONTROL
Filed July 12, 1954 5 Sheets-Sheet 1

INVENTOR.
WALTER J BROWN
BY
James B. Grant
Attorney

May 5, 1959 W. J. BROWN 2,885,621
CURRENT REGULATING CIRCUITS FOR MOTOR CONTROL
Filed July 12, 1954 5 Sheets-Sheet 2

INVENTOR.
WALTER J BROWN
BY
James B. Grant
Attorney

May 5, 1959 W. J. BROWN 2,885,621
CURRENT REGULATING CIRCUITS FOR MOTOR CONTROL
Filed July 12, 1954 5 Sheets-Sheet 3

INVENTOR.
WALTER J BROWN
BY
James B. Grant
Attorney

May 5, 1959

W. J. BROWN 2,885,621

CURRENT REGULATING CIRCUITS FOR MOTOR CONTROL

Filed July 12, 1954

INVENTOR.
WALTER J BROWN
BY James B. Grant
Attorney

May 5, 1959  W. J. BROWN  2,885,621
CURRENT REGULATING CIRCUITS FOR MOTOR CONTROL
Filed July 12, 1954  5 Sheets-Sheet 5

*INVENTOR.*
WALTER J BROWN
BY
James B. Grant
*Attorney*

United States Patent Office 2,885,621
Patented May 5, 1959

2,885,621

CURRENT REGULATING CIRCUITS FOR MOTOR CONTROL

Walter J. Brown, Stamford, Conn.

Application July 12, 1954, Serial No. 442,496

14 Claims. (Cl. 318—373)

This invention relates to circuits for regulating the current or for limiting the maximum current in an electric power converter which has an alternating voltage input and an output comprising an alternating current component superimposed on a direct current component. It is particularly applicable to rectifiers having an alternating voltage input and which deliver output pulses of current which may be discontinuous, to a load in which it is desired to regulate or limit the maximum current. It is especially useful for regulating or limiting the maximum output current of a single phase half-wave rectifier, though it is not restricted to same, and may be used in connection with single phase full-wave rectifiers, and under some conditions even with polyphase half-wave or full-wave rectifiers.

In accordance with this invention, the current in a converter of the type described is regulated or limited by providing a source of reference voltage comprising alternating and direct components which form a reference voltage envelope of suitable waveshape for comparison with the waveshape of a feedback voltage derived from the converter current, and connecting said reference and feedback voltages in opposition through a control device which regulates the converter output; preferably the control device has asymmetric characteristics or is connected in series with a rectifier. The control device may comprise a phase-shifting network, a space discharge device, a magnetic amplifier or any device for continuously controlling the converter output.

Preferably the reference voltage is produced by a rectifier supplied from the alternating voltage input; the alternating component of the reference voltage envelope may be phase displaced with regard to the alternating voltage input, so as to correspond more closely with the waveshape of the feedback voltage.

Figure 1:
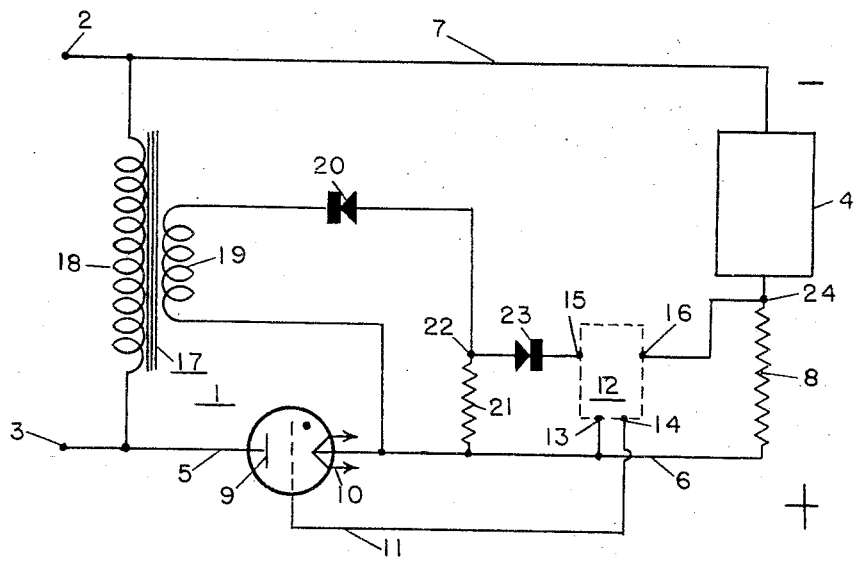
Figure 1 is schematic diagram of one form of the invention.

Fig. 1 illustrates schematically one form of the invention. The electric power converter 1, comprising in this instance a space discharge device, is connected between alternating voltage input terminals 2 and 3, in series with a load 4, through conductors 5, 6, and 7, and a series impedance which is shown as a resistor 8. The space discharge device 1 includes an anode 9, a cathode 10 and a grid 11, and its output is controlled by a control device shown schematically by the dotted rectangle 12 which has terminals 13 and 14 which are connected to cathode 10 and grid 11. The control device 12 is also provided with signal terminals 15 and 16 which are so arranged as to reduce the output of the converter 1 when a signal current flows between said terminals in the appropriate direction.

A transformer 17 has its primary 18 connected across the alternating voltage input terminals 2 and 3, and its secondary 19 is connected through rectifier 20 across a resistor 21, one end of which is connected to conductor 6 and cathode 10. Accordingly, a half-wave rectified current flows through resistor 21 and develops across said resistor a reference-voltage-envelope having the shape of one half of a sine wave, as shown by the solid line curve 31 in Fig. 2. The upper or negative terminal 22 of resistor 21 in Fig. 1 is connected through rectifier 23 and through the signal terminals 15 and 16 of control device 12, to the upper or negative terminal 24 of series resistor 8. When the converter 1 is delivering a normally permissible amount of current to the load 4, the voltage across resistor 8 will have a waveform such as that shown by the chain-dotted line 32 in Fig. 2, which line lies wholly above or within the voltage reference envelope 31; accordingly the potential at terminal 24 is at all times higher than the potential at terminal 22 and accordingly the rectifier 23 will not conduct, and there will be no signal current between terminals 15 and 16 and therefore no current-limiting effect will occur.

If the current through the converter 1 and load 4 is now increased so that the voltage across resistor 8 has a waveshape similar to the dotted curve 33 in Fig. 2, which is below or outside the reference-voltage envelope 31, the potential at terminal 24 will be lower than the potential at terminal 22 (at least during part of the cycle), and the rectifier 23 will conduct, thus allowing a signal current to flow between terminals 15 and 16 which acts upon the control device 12 to reduce or limit any further increase in the output of the converter 1 to the load 4.

Figure 2:
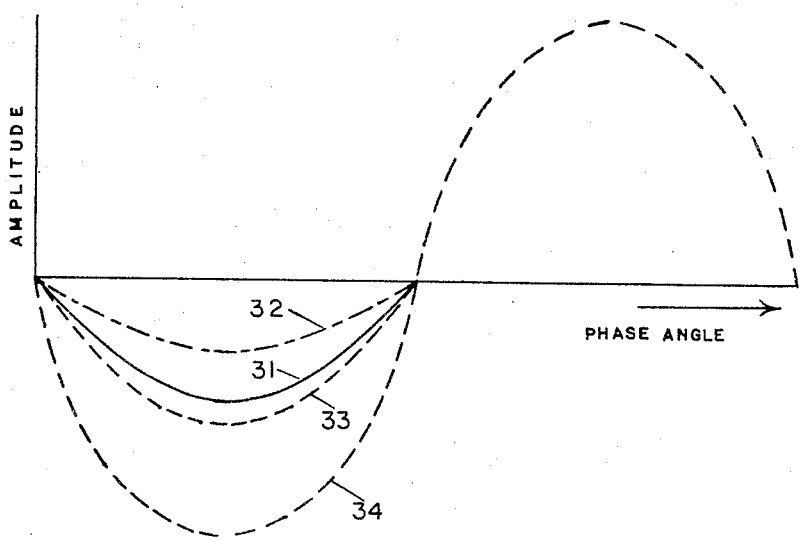
Figure 2 shows the voltage wave forms occuring in the arrangement of Figure 1.

In Fig. 2 the dashed line 34 represents, on a reduced amplitude scale, the alternating voltage applied between terminals 2 and 3. Fig. 2 illustrates a condition in which the load current (represented by curve 32 or 33) may be said to be "in phase" with the alternating voltage source (represented by curve 34), inasmuch as their peak amplitudes occur at the same electrical phase angle. However, in many practical circuit arrangements, the starting point of the load current pulse may be delayed by retarding the ignition angle of the converter 1 by means of its grid 11, and furthermore the finishing point of the load current pulse may also or alternatively be delayed if the load 4 possesses inductive reactance. Under these conditions the feedback voltages across impedance 8 which are representative of load current may have wave-shapes such as those illustrated by curves 42 and 43 in Fig. 3, in relation to the alternating voltage source which is represented, on a reduced amplitude scale, by curve 44. Under such conditions, it is desirable that the reference voltage envelope 41 should also have its phase angle delayed so that its peak amplitude occurs later in the cycle than the peak of the alternating voltage input wave 44.

Figure 4:
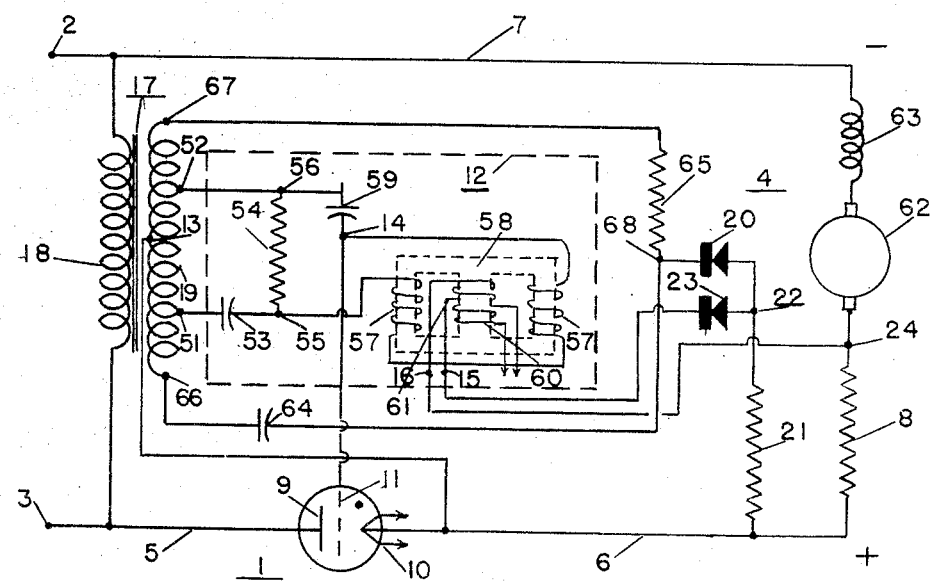
Figure 4 shows an alternative circuit diagram.

Fig. 4 shows a diagram of a circuit in which the reference voltage envelope is delayed by retarding the phase angle of the alternating voltage which is rectified to produce said envelope. Many of the components are similar to those of Fig. 1 and are similarly numbered and their description will not be repeated. In Fig. 4, the control device 12 comprises a phase shifting network supplied with an alternating voltage input from terminals 51 and 52 of transformer secondary 19; condenser 53 and resistor 54 are arranged to establish an alternating "baseline" voltage for the phase shifting network, between terminals 55 and 56 of resistor 54. The A.C. windings 57 of a saturable reactor 58 are connected in series with a condenser 59 between terminals 55 and 56, and their point of series connection 14 forms one output terminal of the phase shifting network 12 and is connected to the grid 11 of converter tube 1; the center tap 13 of transformer secondary 19 forms the other output terminal of the phase shifting network 12 and is connected to the cathode 10 of tube 1. The principle of operation of the phase shifting network 12 is described in my United States Patent No. 2,524,762, issued October 10, 1950. The saturable reactor 58 is provided with direct current signal windings 60 and 61 for the purpose of varying the inductance of the A.C. windings 57 and therefore varying the phase angle of the alternating voltage which is applied between grid 11 and cathode 10, and thus varying the output of converter 1 to load 4. The signal winding 60 is connected in any manner suitable for the normal control of the converter 1, for instance as described in my United States Patent No. 2,640,959, issued June 2, 1953, in my co-pending application Serial No. 110,812, filed August 17, 1949, now Patent No. 2,697,194, or alternatively as described in my United States patent application Serial No. 222,378, filed April 23, 1951, now Patent No. 2,733,395; United States patent application Serial No. 352,428, filed May 1, 1953, now Patent No. 2,777,106; United States patent application Serial No. 352,429, filed May 1, 1953, now Patent No. 2,799,818; United States patent application Serial No. 424,476, filed April 19, 1954, now Patent No. 2,799,819. The signal winding 61 is connected so that when it is energized through rectifier 23 it tends to reduce the output of converter 1, for instance by opposing the magnetization of the core of saturable reactor 58 due to signal winding 60.

Figure 5:
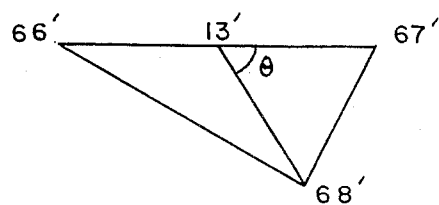
Figure 5 is a voltage vector diagram relating to Figure 4.

The load 4 is shown in the form of an electric motor having an armature 62 and an inductive component 63 which may comprise the inductive reactance of the armature 62, with or without the inductive reactance of a series field winding. The current pulses in the load are accordingly delayed so that the feedback voltage across resistor 8 has a waveshape such as curve 42 or 43 of Fig. 3. The circuit of Fig. 4 provides for delaying the reference voltage envelope 41 to the extent required in accordance with Fig. 3. For this purpose, a condenser 64 and resistor 65 are serially connected across terminals 66 and 67 of transformer secondary 19, through a point of series connection 68. The corresponding vector diagram is shown in Fig. 5, from which it is evident that an alternating voltage 13'—68' is developed between the center tap 13 and the point 68 which is lagging by an angle θ behind the alternating input voltage represented by the transformer secondary voltage 66'—67'. This lagging voltage 13'—68' is rectified by rectifier 20 and applied to resistor 21 to produce a reference voltage envelope similar to that of curve 41 of Fig. 3.

Figure 3:
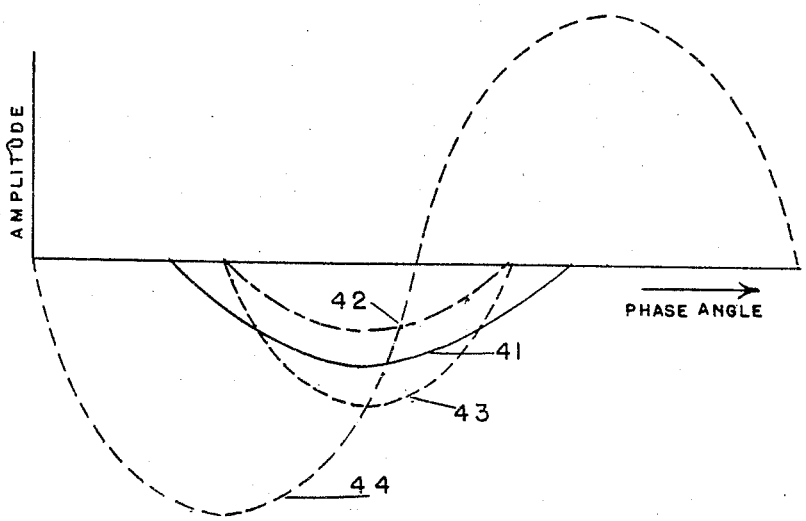
Figure 3 shows the voltage wave forms in an alternative operating condition.

When the load current is below the maximum permissible value, the voltage across resistor 8 has a waveshape such as curve 42 in Fig. 3, which curve lies wholly within or above the reference voltage envelope 41, so that the potential at terminal 24 is always above the potential at terminal 22 and the rectifier 23 will not conduct and there is no current-limiting effect. If the load current increases so that the voltage across resistor 8 has a waveshape such as curve 43 of Fig. 3 which projects below or outside the reference voltage envelope 41, the potential at terminal 24 will at times be lower than the potential at terminal 22 and the rectifier 23 will tend to conduct during such periods and to allow a signal current to flow in the signal winding 61 between terminals 15 and 16 which tends to reduce the output of converter 1 and to limit any further increase in load current; this effect may be modified to some extent by any inductive voltages which may be induced in the signal winding 61, either by self-induction from the current flowing therein or by mutual induction from the currents flowing in other windings on the core of the saturable reactor 58. The curve 44 of Fig. 3 represents the alternating input voltage to a reduced amplitude scale.

Figure 6:
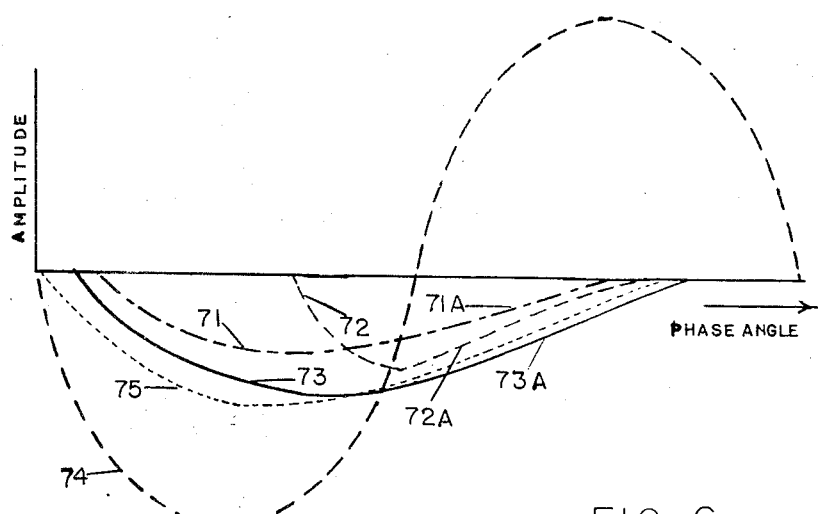
Figure 6 shows alternative voltage wave forms.
Figure 9:
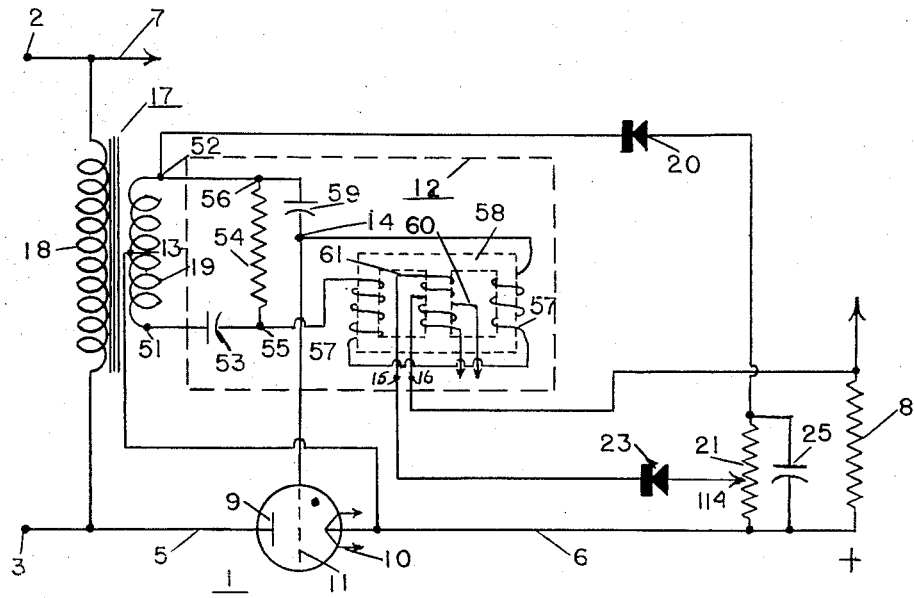
Figure 9 shows another arrangement of a part of the circuits which are shown in Figures 1, 4 and 7.
Figure 10:
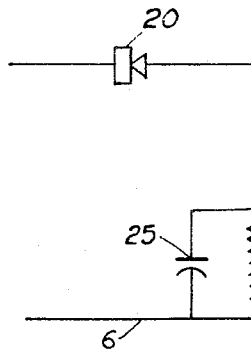
Figure 10 shows a further alternative arrangement of a part of the circuit of Figures 1, 4, 7 and 8.

In some cases when a wide range of control is provided for the ignition angle of converter tube 1, for instance by adjusting the voltage across signal winding 60 to provide a wide range of speeds in a motor armature 62 of Fig. 4, the curves representing the voltages across resistor 8 may embrace a wide total range of phase angle, exceeding 180°. This is illustrated by curve 71 of Fig. 6 representing a high motor speed, and curve 72 representing a low motor speed; the range of phase angles embraced by these curves may be still further extended by a slow decay of the current at the end of each pulse, as indicated by the tailing portions 71a and 72a of the curves 71 and 72; this slow decay may result from eddy current effects in an inductive load, or from counter E.M.F. generated in a motor armature load. In order to accommodate this wide range of phase angles, the phase angle embraced by the reference voltage envelope may be extended beyond 180° as shown by curve 73 with its tailing portion 73a, by means of a condenser 25 connected across the resistor 21 in Fig. 1 or Fig. 4 as shown in Fig. 10. By extending the duration of the reference voltage envelope in this way, as shown in Fig. 9, as discussed hereinafter the need for retarding its phase angle may in some cases be eliminated.

Figure 7:
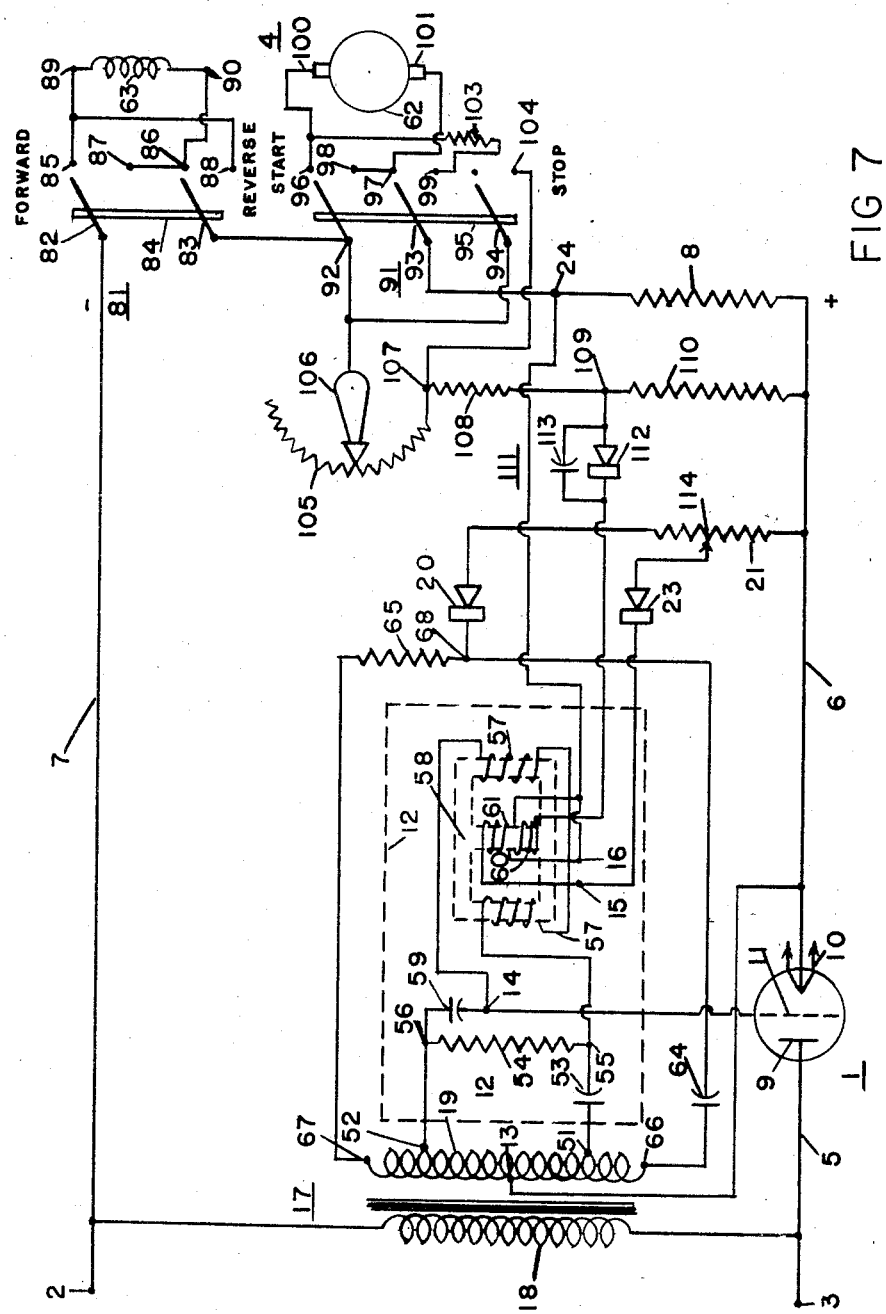
Figure 7 is a complete circuit diagram of another arrangement of the invention.

Fig. 7 shows a complete diagram of a circuit for controlling or adjusting the speed of a series-wound electric motor, having a field winding 63 and armature 62, in either direction of rotation, and for limiting the motor current during periods of excessive load, or during acceleration or reversal of the motor. Fig. 7 also illustrates a novel method for electrically braking a motor by utilizing the current-limiting effect in conjunction with simultaneous reversal of the motor and adjustment of its speed-controlling element to zero speed. Many of the parts in Fig. 7 are similar to those of Fig. 4 and are similarly numbered and their description will not be repeated. In Fig. 7, however, a reversing switch 81 is provided, with movable arms 82 and 83 mechanically coupled by linkage 84, and arranged to make contact with terminals 85 and 86 respectively with the switch in its upper position, or with terminals 87 and 88 respectively with the switch in its lower position. Terminals 85 and 88 are connected together and to the upper terminal 89 of field winding 63, while terminals 86 and 87 are connected together and to the lower terminal 90 of field winding 63. Accordingly, the field winding 63 may be reversed so as to reverse the rotation of the motor, by moving switch 81 from its upper to its lower position. Furthermore, the switch 91 is provided for electrically braking the motor, and it comprises three switch arms 92, 93 and 94 coupled by a mechanical linkage 95. When in its upper or running position, switch arms 92 and 93 make contact with terminals 96 and 97, and thence with armature terminals 100 and 101 respectively; when in its lower or braking position, switch arms 92 and 93 make contact with terminals 98 and 99 and thence with armature terminals 101 and 100 respectively, so that the armature is reversed, and at the same time a resistor 103 is introduced in series with the armature. At the same time the switch arm 94 makes contact with terminal 104 when in its lower position, and thus short circuits the speed-controlling rheostat 105 which will now be described. The upper end of rheostat 105 is connected through its slider 106 to the switch arms 92 and 94. The lower end 107 of rheostat 105 is connected through a resistor 108 to a tapping point 109 and thence through resistor 110 to the conductor 6. The rheostat 105, resistor 108 and resistor 110 form a potential divider 111 connected across the motor armature 62 and the series resistor 8, as described in my co-pending application, Serial Number 352,429, now Patent No. 2,799,818. The tapping point 109 on said potential divider is connected through rectifier 112 and signal winding 60 to the junction point 24 between the armature 62 and the series resistor 8; a condenser 113 is preferably connected across rectifier 112 to reduce the ripple across said rectifier when the switch 91 is in the "Start" position as shown in Fig. 7. The system operates to maintain the speed of motor armature 62 at a predetermined value which may be selected by rheostat 105 and which may be substantially independent of load, as described in my co-pending application, Serial Number 352,429.

As disclosed in the above mentioned co-pending applications, a feedback voltage is developed across series resistor 8, when the motor is running, which is directly proportional to the field current. The output of the converter 1 is continuously regulated so as to maintain only a small difference of potential across the signal winding 60 and therefore between the junction point 24 and terminal 109. Accordingly, the output of the converter will always be such that the ratio of armature voltage to the voltage drop in series resistor 8 is maintained substantially equal to the ratio of the resistances of rheostat 105 plus resistor 108 to resistor 110. Since the field current is directly proportional to the voltage drop in series resistor 8, the armature voltage will be maintained at all times proportional to the field current. This is equivalent to maintaining a constant ratio of armature voltage to field current and accordingly the motor will run at a substantially constant speed regardless of its load, neglecting the effects of magnetic saturation.

The speed may be decreased by decreasing the ohmic value of rheostat 105 and resistor 108, and the ohmic value of resistor 108 is chosen to give substantially zero speed when the rheostat 105 is short-circuited by switch arm 94 and terminal 104; accordingly, when switch 91 is moved to its lower position the armature is reversed and the motor is quickly decelerated by the reverse current flowing therein which, however, is limited by the current-limiting circuit described with reference to Fig. 4, and the speed is simultaneously reduced to zero by shorting out the rheostat 105 so that the motor does not reverse, but is regeneratively braked or plugged to a standstill. The resistor 103 may simply comprise the inherent resistance of the conductors, but in some cases it may be desirable to add a separate resistor in order to limit the armature current which flows during the braking operation.

In Fig. 7, the resistor 21 is provided with on adjustable tap 114, whereby the reference voltage, and accordingly the limiting current value, may be adjusted.

Figure 8:
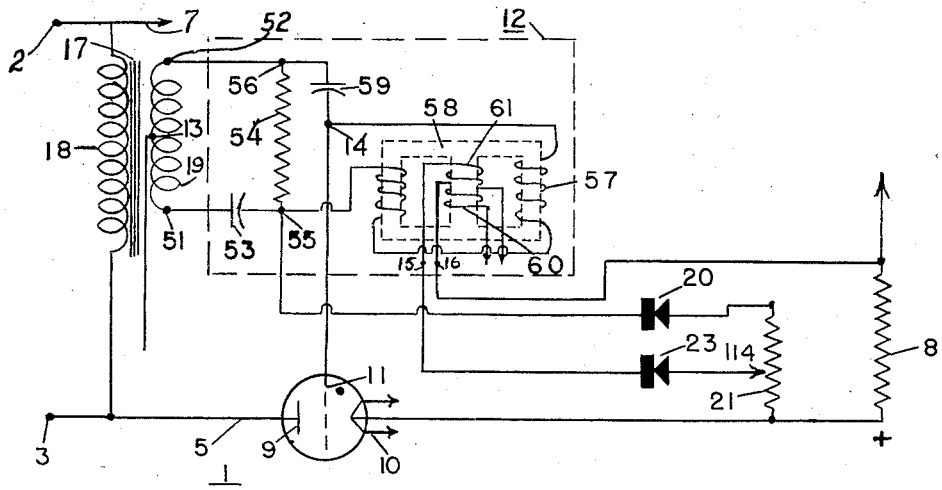
Figure 8 shows an alternative arrangement of a part of the circuit of Figures 4 and 7.

Fig. 8 shows an alternative arrangement of a part of the circuit of Figs. 4 and 7. Some of the parts are similar to those of Figs. 4 and 7, and are similarly numbered. In Fig. 8, however, the rectifier 20, which supplies half-wave pulses of voltage to the reference voltage potentiometer 21, is connected to point 55 on the circuit of the phase-shifting network, instead of to point 68, while the condenser 64 and resistor 65 are omitted, thus resulting in an economy of components. It will be seen that the vector relationship of the voltage between points 13 and 55 in relation to the secondary voltage of transformer 17 is generally similar to the vector relationship of the voltage 13'—68' to the voltage 66'—67' in the vector diagram of Fig. 5; accordingly the current-limiting circuit of Fig. 8 may be substituted for that of Fig. 4 or Fig. 7.

Fig. 9 shows another arrangement of a part of the circuits which are shown in Figs. 1, 4 and 7. In Fig. 9, the circuit has been simplified by connecting the rectifier 20 to transformer terminal 52, so that the alternating voltage applied to rectifier 20 is substantially in phase with the alternating supply voltage. However, the duration of the rectified pulse of reference voltage which is developed across resistor 21 is extended by connecting a relatively large condenser 25 across the resistor 21, so as to produce a voltage waveform similar to the pecked line 75 in Fig. 6; this simplified arrangement may provide a suitable reference voltage waveform for use with output current waveforms such as are illustrated in Fig. 6.

Fig. 10 shows an alternative arrangement of a part of the circuits of Figs. 1, 4, 7, and 8 including resistor 21 and rectifier 20. In the alternative arrangement of Fig. 10, a condenser 25 is connected across the resistor 21 for the purpose of extending the duration of the reference voltage envelope as illustrated by curve 73 with its tailing portion 73A of Fig. 6.

While I have described several embodiments of my invention in detail, it will be appreciated that many other arrangements also fall within the scope of this invention.

For instance, the converter 1 and control device 12 may comprise any type of converter which delivers a pulsating output, and any type of control device for continuously varying the converter output in accordance with one or more electrical signals. The converter may for example comprise any kind of space discharge device such as a gas or vapor filled tube either with a heatable cathode or with a pool type cathode such as a mercury arc rectifier, and its output may be controlled by any of the known methods, such as by variation of its grid voltage or of a magnetic field in accordance with a signal voltage; vacuum tube amplifiers may be included in the control device if desired. Alternatively the converter may comprise a rectifier which is supplied with alternating current power under the control of a magnetic amplifier to which electrical signals are applied for controlling the output.

Furthermore, the invention may be used as a current-regulating circuit for controlling the converter output so as to provide a substantially constant current under normal operating conditions, rather than as a current-limiting circuit to control the output only under conditions of undesirably high current. In such an arrangement the rectifier 23, shown in Fig. 1 and in other figures, may sometimes be eliminated, so that a signal voltage is continuously applied to the signal terminals 15 and 16 so as to regulate the output current continuously.

What is claimed is:

1. In a system for regulating or limiting the current supplied from an A.C. source by a controllable half-wave rectifier to a load; means for deriving a pulsating voltage from said current; a phase-displacing network having its input energized by said A.C. source and its output connected to a half-wave reference rectifier to develop a pulsating reference voltage, which is phase displaced with reference to the A.C. source; and means for comparing said pulsating voltages and thereby regulating said controllable half-wave rectifier.

2. A current-limiting circuit for a controllable half-wave rectifier having control terminals, and arranged to supply current from an A.C. source to a load, comprising: a phase-displacing network having its input energized from said A.C. source; a half-wave reference rectifier and a reference voltage circuit energized by said reference rectifier from said network; an impedance connected in series with the load; a half-wave comparison rectifier; and connections between said reference voltage circuit, said impedance, said control terminals and said comparison rectifier; whereby the voltages across said reference voltage circuit and said impedance are compared and the load current is limited whenever the instantaneous voltages across said impedance and across said reference voltage circuit are such as to cause said comparison rectifier to conduct.

3. The combination of claim 2 in which the reference voltage circuit comprises a resistor.

4. The combination of claim 2 in which the reference voltage circuit comprises a resistor with a condenser at least partially in parallel therewith.

5. The combination of claim 2 embodying a control device for said controllable rectifier, in which said control device includes said phase-displacing network.

6. The combination of claim 5 in which said control device is a variable phase-shifting network comprising inductive and capacitive elements serially connected with an output terminal between them, and energized by a baseline voltage derived from said phase-displacing network.

7. The combination of claim 6 including means for varying the relative impedance of said inductive and capacitive elements whereby on a voltage vector diagram said output terminal establishes a locus which lies upon an arc spanning the vector of said baseline voltage, and other circuit means for establishing a potential point at another output terminal of said network which is between said arcuate locus and said baseline voltage vector.

8. The combination of claim 2 in which the load comprises at least the armature of an electric motor and switching means are provided for reversing the connections of the armature in relation to the field, whereby the motor may be smoothly reversed under conditions of limited maximum current.

9. The combination of claim 2 in which the load comprises the armature of an electric motor, and the converter includes a speed-controlling device in which switching means are provided for reversing the connections of the armature in relation to the field of said motor and for simultaneously energizing said device to a condition corresponding to zero speed, whereby the motor is electrically braked to a standstill.

10. An electrical braking circuit for a motor having armature and field windings, comprising: a motor circuit including at least the armature with an impedance in series therewith; a speed-controlling circuit including an electric power converter and a control device for controlling the converter output, a potential divider having a tapping point supplying a speed-controlling voltage, a junction point intermediate between the ends of said motor circuit for deriving a feedback voltage from the motor, a connection from said tapping point to said control device, a connection from said control device to said junction point and a connection from another point on said potential divider to another point on said motor circuit; a current-limiting circuit including a source of reference voltage, a rectifier serially connected through terminals of said control device between said source and said impedance, and a connection between another point on said source and another point on said impedance; switching means for reversing the armature in relation to the field winding; and simultaneous switching means connected to said potential divider for reducing said speed-controlling voltage to a value at which the motor will not run in the reversed direction.

11. An electrical braking circuit for a motor having armature and field windings, comprising: a motor circuit including at least the armature with an impedance in series therewith; a speed-controlling circuit including an electric power converter and a control device for controlling the converter output, a potential divider having a tapping point supplying a speed-controlling voltage, a junction point intermediate between the ends of said motor circuit for deriving a feedback voltage from the motor, a connection from said tapping point to said control device, a connection from said control device to said junction point and a connection from another point on said potential divider to another point on said motor circuit; a current-limiting circuit as claimed in claim 5 for limiting the converter output when voltage across said impedance exceeds a predetermined reference voltage; switching means for reversing the armature in relation to the field winding; and simultaneous switching means connected to said potential divider for reducing said speed-controlling voltage to a value at which the motor will not run in the reversed direction.

12. In a system for regulating or limiting the current supply from an A.C. source to a load by a controllable first half-wave rectifier: a resistor connected in series with said load for deriving a first voltage of pulsating wave-form from said current; a reference voltage circuit including a second half-wave rectifier energized by said A.C. source and delivering a second pulsating voltage, said reference voltage circuit also including a delay network for delaying or extending the duration of the pulsations of said second voltage, and means for comparing said first and second pulsating voltages and thereby regulating said controllable rectifier.

13. A current-limiting circuit for a controllable half-wave rectifier having control terminals, and arranged to supply current from an A.C. source to a load, comprising: a half-wave reference rectifier and a reference voltage circuit energized by said reference rectifier from said A.C. source; an impedance connected in series with the load; a half-wave comparison rectifier; and connections between said reference voltage circuit, said impedance, said control terminals, and said comparison rectifier; whereby the voltages across said reference voltage circuit and said impedance are compared and the load current is limited whenever the instantaneous voltages across said impedance and across said reference voltage circuit are such as to cause said comparison rectifier to conduct; and in which the load supplied by said A.C. source comprises at least the armature of an electric motor, and the converter includes a speed-controlling device in which switching means are provided for reversing the connections of the armature in relation to the motor field, and for simultaneously switching said device to a condition corresponding to zero speed, whereby the motor is electrically braked to a standstill.

14. An electrical braking circuit for a motor having armature and field windings, comprising: a motor circuit including at least the armature with an impedance in series therewith; a speed-controlling circuit including an electric power converter, a control device for controlling the converter output, a potential divider having a tapping point supplying a speed-controlling voltage, a junction point intermediate between the ends of said motor circuit for deriving a feedback voltage from the motor, a connection from said tapping point to said control device, a connection from said control device to said junction point and a connection from another point on said potential divider to another point on said motor circuit; a current limiting circuit for a controllable half-wave rectifier having control terminals, and arranged to supply current from an A.C. source to a load, comprising: a half-wave reference rectifier and a reference voltage circuit energized by said reference rectifier from said A.C. source; an impedance connected in series with the load; a half-wave comparison rectifier; and connections between said reference voltage circuit, said impedance, said control terminals, and said comparison rectifier; whereby the voltages across said reference voltage circuit and said impedance are compared and the load current is limited whenever the instantaneous voltages across said impedance and across said reference voltage circuit are such as to cause said comparison rectifier to conduct; being a current-limiting circuit for limiting the converter output when the voltage across said impedance exceeds a predetermined reference voltage; switching means for reversing the armature in relation to the field winding; and simultaneous switching means connected to said potential divider for reducing said speed-controlling voltage to a value at which the motor will not run in the reversed direction.

References Cited in the file of this patent
UNITED STATES PATENTS

| | | |
|---|---|---|
| 2,517,101 | Few | Aug. 1, 1950 |
| 2,590,180 | Juhola | Mar. 25, 1952 |